UNITED STATES PATENT OFFICE.

FREDERICK W. SPERR, JR., OF OAKMONT, AND MARC DARRIN, OF WILKINSBURG, PENNSYLVANIA, ASSIGNORS TO H. KOPPERS COMPANY, OF PITTSBURGH, PENNSYLVANIA, A CORPORATION OF PENNSYLVANIA.

MANUFACTURE OF RESINS.

1,263,813.     Specification of Letters Patent.     Patented Apr. 23, 1918.

No Drawing.     Application filed December 7, 1917. Serial No. 206,099.

*To all whom it may concern:*

Be it known that we, FREDERICK W. SPERR, Jr., and MARC DARRIN, both citizens of the United States, residing at Oakmont and Wilkinsburg, respectively, both in the county of Allegheny and State of Pennsylvania, have invented a new and useful Improvement in the Manufacture of Resins, of which the following is a full, clear, and exact description.

The invention relates to the production of resins from compounds of the coumarone-indene group, and more particularly to the production of resins from crude solvent naphtha obtained from gas, tar or petroleum.

The principal constituents of crude solvent naphtha are as follows:

Class A.

Coumarone $(C_6H_4)(C_2H_2O)$
Indene $(C_6H_4)(C_3H_4)$
Methyl coumarone $(C_6H_3)(C_2H_2O)(CH_3)$
Dimethyl coumarone $(C_6H_2)(C_2H_2O)(CH_3)_2$
Trimethyl coumarone $(C_6H)(C_2H_2O)(CH_3)_3$
Hydrindene $(C_6H_4)(C_3H_6)$
Dicyclopentadiene $(C_5H_6)_2$
Styrolene $(C_6H_5)(CH:CH_2)$, etc.

Class B.

Xylenes $(C_6H_4)(CH_3)_2$
Ethyl toluene $(C_6H_4)(CH_3)(C_2H_5)$
Mesitylene $(C_6H_3)(CH_3)_3$ (1-3-5)
Pseudocumene $(C_6H_3)(CH_3)_3$ (1-2-4)
Hemimellithene $(C_6H_3)(CH_3)_3$ (1-2-3)
Cymene $(C_6H_4)(CH_3)(C_3H_7)$
Butyl benzene $(C_6H_5)(C_4H_9)$, etc.

Class C.

Naphthalene $(C_{10}H_8)$
Heavy oily material, etc.

The present invention relates particularly to the substance in Class A *supra* which may be defined as the "coumarone-indene group". These are condensable substances, capable either of polymerization or of direct chemical union with each other, to form compounds of higher molecular weight, which are usually of a viscous or resinous nature. The process is not limited to the polymerization of coumarone-indene, etc., to para-coumarone, para-indene, etc., as there may be a condensation or union between dissimilar chemical units such as coumarone and indene, or coumarone and methyl coumarone, etc. The present process relates particularly to the condensation of polymerization of the compounds of Group "A" *supra* into such substances as para-coumarone $(C_8H_6O)_x$, para-indene $(C_9H_8)_x$, etc., or into mixed chemical substances as explained above. These products are hard or soft resins depending upon the manipulation of the process, and are suitable for use in paints, varnishes, insulating compounds and other compositions, where ordinary gum or fossil resins are generally used. The above described synthetic resin is chemically more resistant to the action of acids, alkalis, water, etc., than ordinary resins, such as rosin, since it is neutral in chemical composition. Its chemical inertness is comparable to the paraffins. Its electrical and insulating properties are also greater than ordinary resins.

By means of the present process, resins of good uniformity are produced from a wide variety of crude solvent naphthas, and by suitably varying the process resins of different melting points may be obtained, up to a resin having a melting point or about 135° C. The process is preferably carried out as follows:—Crude solvent naphtha is heated under pressure in an autoclave. This causes a resinification of the compounds in Class A *supra*, which are in a solution of the liquid compounds of Classes B and C. This step may be carried out advantageously in a continuous autoclave consisting, for example, of pipes set within a furnace and within which pipes the pressure is maintained by means of a high pressure pump. However, the autoclave may be of intermittent character, the pressure being maintained by the vapor pressure of the solvent naphtha, or a more volatile liquid may be added to increase the pressure without a corresponding increase in the temperature.

The pressure at which the autoclave is operated depends on the character of the crude solvent naphtha, the nature of the resin desired, the temperature at which the autoclave is operated, and the time of duration of treatment. Good results have been obtained using the pressures of from 50 to 300 pounds per square inch, for a period of from one to ten hours, and using temperatures of from 100° C. to 450° C. Low pressures and temperatures require a longer period of treatment, while high pressures and temperatures give better yields, but darker colored resins. After the treatment of the crude solvent naphtha in the autoclave, it is distilled in a suitable still until the temperature of the vapors reaches a certain point, which depends upon the nature of the crude solvent naphtha and the consistency of the desired resin product. The end temperature of the vapors during this distillation is preferably between 150° to 300° C. The lower the temperature of the vapors, the softer is the grade of resin produced. Different grades of resin may be produced by carrying the distillation to a higher or lower vapor temperature. The distillate is suitable for any use to which pure solvent naphtha is ordinarily applied.

As soon as the temperature of the vapors has reached the proper point for producing the desired grade of resin, steam, air or other gaseous fluid is blown through the liquid residue in the still and sufficient heat is applied to maintain the residue at approximately the same temperature. This step of blowing effects the removal of the oily materials of Class C *supra*, together with naphthalene and similar substances, and is preferably continued until tests of the resinous material remaining in the still show that it has reached the desired consistency. The resin thus obtained is drawn off from the still and solidified by cooling.

Resin produced by this method has a clear yellow, or reddish, or brown color, and is hard and tough and very resistant to the action of acids and alkalis. It is soluble in practically all organic solvents, except alcohol. The melting point depends upon the temperature of distillation and duration of the blowing operation. By using low temperatures and short blowing periods, soft resins of a melting point of about 30° C. may be obtained, while by using a higher temperature and prolonged blowing, a melting point as high as 135° C. may be obtained.

The rate of resinification and the hardness of the derived resins may be increased by the use of strips of such metals as copper, silver, gold, platinum, etc., which are immersed in liquid during treatment either in the autoclave or still and act as catalytic agents.

The present invention is not limited to its preferred embodiment, but may be embodied in other processes within the scope of the following claims:

We claim:

1. That step in the herein described process of producing resins from compounds of the coumarone-indene group which consists in subjecting such compounds to heat and pressure.

2. That step in the herein described process of producing resins from compounds of the coumarone-indene group contained in a liquid solution, which consists in subjecting the solution to heat and pressure.

3. That step in the herein described process of producing resins from crude solvent naphtha which consists in subjecting the crude solvent naphtha to heat and pressure.

4. The herein described process of producing resins from solutions containing compounds of the coumarone-indene group, comprising the steps of subjecting the solution to heat and pressure, distilling it, and blowing a gaseous fluid through the residue.

5. The herein described process of producing resins from crude solvent naphtha, comprising the steps of subjecting the crude solvent naphtha to heat and pressure, distilling it, and blowing a gaseous fluid through the residue.

6. The herein described process of producing resins from solutions containing compounds of the coumarone-indene group, comprising the steps of subjecting the solution to heat and pressure, distilling it, and blowing a gaseous fluid through the residue while maintaining it at the desired temperature.

7. That step in the herein described process of producing resins from compounds of the coumarone-indene group, which consists in passing such compounds continuously through an autoclave in which they are subjected to the action of heat and pressure.

8. That step in the herein described process of producing resins from compounds of the coumarone-indene group, which consists in subjecting such compounds to heat and a pressure of between 50 and 300 pounds per square inch.

9. That step in the herein described process of producing resins from compounds of the coumarone-indene group, which consists in subjecting such compounds to heat and pressure in the presence of a catalytic agent.

10. That step in the herein described process of producing resins from crude solvent naphtha which consists in subjecting the crude solvent naphtha to heat and pressure in the presence of a catalytic metal.

11. The herein described process of producing resins from compounds of the coumarone-indene group, comprising the steps of subjecting such compounds to heat and pressure and afterward to distillation, and during one or both of said steps subjecting them to the action of a catalytic agent.

In testimony whereof, we have hereunto set our hands.

FREDERICK W. SPERR, Jr.
MARC DARRIN.

It is hereby certified that in Letters Patent No. 1,263,813, granted April 23, 1918, upon the application of Frederick W. Sperr, Jr., of Oakmont, and Marc Darrin, of Wilkinsburg, Pennsylvania, for an improvement in "The Manufacture of Resins," errors appear in the printed specification requiring correction as follows: Page 1, line 56, for the word "of" read *or;* same page, line 79, for the word "or" read *of;* and that the said Letters Patent should be read with these corrections therein that the same may conform to the record of the case in the Patent Office.

Signed and sealed this 21st day of May, A. D., 1918

[SEAL.]

R. F. WHITEHEAD,
*Acting Commissioner of Patents.*

Cl. 134—26.